United States Patent [19]
Shibayama

[11] Patent Number: 4,998,808
[45] Date of Patent: Mar. 12, 1991

[54] COMPACT ZOOM LENS
[75] Inventor: Atsushi Shibayama, Kawasaki, Japan
[73] Assignee: Nikon Corporation, Tokyo, Japan
[21] Appl. No.: 552,422
[22] Filed: Jul. 13, 1990
[30] Foreign Application Priority Data
  Jul. 18, 1989 [JP] Japan .................................. 1-186277
  Sep. 14, 1989 [JP] Japan .................................. 1-239553
[51] Int. Cl.⁵ ........................ G02B 15/14; G02B 9/64
[52] U.S. Cl. ...................................................... 350/427
[58] Field of Search ......................................... 350/427
[56] References Cited
U.S. PATENT DOCUMENTS
  4,911,539  3/1990  Tsunashima et al. ............... 350/427
  4,929,069  5/1990  Shibayama .......................... 350/427

Primary Examiner—Bruce Y. Arnold
Assistant Examiner—Rebecca D. Gass
Attorney, Agent, or Firm—Shapiro and Shapiro

[57] ABSTRACT

A zoom lens has a compact and simple structure, with satisfactorily corrected aberration and with a zooming ratio exceeding 2.0. The lens has a first lens group $G_1$ of a positive refractive power and a second lens group $G_2$ of a negative refractive power arranged in this order from the object side and effecting zooming operation by varying the distance of the lens groups. The first lens group $G_1$ has a front group $G_F$ of a positive refractive power and a rear group $G_R$ of a positive refractive power, arranged in this order from the object side. The front group $G_F$ comprises a positive meniscus lens $L_{11}$ convex to the object side, a negative lens $L_{12}$ concave to the object side, a positive lens component $L_{13}$ and a positive lens component $L_{14}$, arranged in this order from the object side. The rear group $G_R$ comprises a positive lens $L_{15}$, and the second lens group $G_2$ comprises a positive meniscus lens $L_{21}$ convex to the image side, a negative lens $L_{22}$, and a negative meniscus lens $L_{23}$ concave to the object side, arranged in this order from the object side. The lens satisfies following conditions:

$-0.8 < f_{22}/f_W < -0.6$
$2.6 < f_R/f_F < 8$
$0.45 < f_{14}/f_W < 1.26$
$-1.1 < f_{22}/f_W < -0.7$
$1.5 < Q_{11} < 5$
$-0.5 < Q_{12} < 1.3$
$-1.8 < Q_{13} < 1$
$-3 < Q_{21} < -2$
$1.2 < Q_{23} < 1.8$
$34 < \nu_{12} < 55$.

4 Claims, 4 Drawing Sheets

COMPACT ZOOM LENS

BACKGROUND OF THE INVENTION

1. Field of the Invention

The present invention relates to a zoom lens adapted for use in a compact camera such as a camera with lens shutter.

2. Related Background Art

Compact cameras with lens shutter have been more and more automated in recent years, with various functions such as automatic focusing, automatic film loading, date recording, incorporated electronic flash etc. as standard equipment, and have become accepted by wider and wider users. Recently there are also commercialized those with a lens of multiple focal lengths, for expanding the field of application further.

Zoom lens of simplest structure suitable for such compact cameras is a two-group telescopic zoom lens composed of a first lens group $G_1$ of a positive refractive power and a second lens group $G_2$ of a negative refractive power. In comparison with the usual lenses for single lens reflex cameras, such lens is more suitable for the cameras with lens shutter, having less restriction on the behind-lens focal length and can achieve compactization by reducing said behind-lens focal length to a certain extent.

However the zoom lenses of this kind proposed before are mostly with focal length in a range of $f = 40–60$ mm and F-number in a range of 4–5.6, and, even in bright lenses with high zooming ratios, the focal length and the F-number are still in ranges of $f = 35–70$ mm and $F = 3.5–6.7$.

Among such lenses, some are designed with an extremely short behind-lens focal length in order to reduce the entire length of the lens. Consequently, even if compactization is achieved in this manner, there may result internal reflections between the last lens face of the lens system and the film plane, eventually leading to the formation of ghost image deteriorating the image quality. Besides the second lens group $G_2$ positioned close to the film plane becomes inevitably large as the diameter thereof has to be close to the size of the film.

Also in such zoom lenses, since the refractive powers of the lens groups are relatively limited in order to secure the imaging performance, there is required a large moving amount for the lens groups for a given zoom ratio, leading to a large lens system.

SUMMARY OF THE INVENTION

In consideration of the foregoing, the object of the present invention is to provide a zoom lens which is free from the above-mentioned drawbacks, and has a compact and simple structure, with satisfactorily corrected aberration and with a zooming ratio exceeding 2.0.

The above-mentioned object can be attained, according to the present invention, by a compact zoom lens having a first lens group $G_1$ of a positive refractive power and a second lens group $G_2$ of a negative refractive power arranged in this order from the object side and effecting zooming operation by varying the distance of said lens groups;

wherein said first lens group $G_1$ has a front group $G_F$ of a positive refractive power and a rear group $G_R$ of a positive refractive power, arranged in this order from the object side;

said front group $G_F$ comprises a positive meniscus lens $L_{11}$ convex to the object side, a negative lens $L_{12}$ concave to the object side, a positive lens component $L_{13}$ and a positive lens component $L_{14}$, arranged in this order from the object side;

said rear group $G_R$ comprises a positive lens $L_{15}$; and said second lens group $G_2$ comprises a positive meniscus lens $L_{21}$ convex to the image side, a negative lens $L_{22}$, and a negative meniscus lens $L_{23}$ concave to the object side, arranged in this order from the object side; and wherein said zoom lens further satisfies following conditions:

$$-0.8 < f_2/f_W < -0.6 \tag{1}$$

$$2.6 < f_R/f_F < 8 \tag{2}$$

$$0.45 < f_{14}/f_W < 1.26 \tag{3}$$

$$-1.1 < f_{22}/f_W < -0.7 \tag{4}$$

$$1.5 < Q_{11} < 5 \tag{5}$$

$$-0.5 < Q_{12} < 1.3 \tag{6}$$

$$-1.8 < Q_{13} < 1 \tag{7}$$

$$-3 < Q_{21} < -2 \tag{8}$$

$$1.2 < Q_{23} < 1.8 \tag{9}$$

$$34 < \nu_{12} < 55 \tag{10}$$

in which:

$f_W$: focal length of entire zoom lens at the wide angle end;

$f_2$: focal length of said second lens group $G_2$;

$f_F$: focal length of said front group $G_F$;

$f_R$: focal length of said rear group $G_r$;

$f_{14}$: focal length of the positive lens component $L_{14}$ in said front group;

$f_{22}$: focal length of the negative lens $L_{22}$ in said second lens group;

$Q_{11}$: shape factor of the positive meniscus lens $L_{11}$ in said front group;

$Q_{12}$: shape factor of the negative lens $L_{12}$ in said front group;

$Q_{13}$: shape factor of the positive lens component $L_{13}$ in said front group;

$Q_{21}$: shape factor of the positive meniscus lens $L_{21}$ in said second lens group;

$Q_{23}$: shape factor of the negative meniscus the $L_{23}$ in said second lens group; and $\nu_{12}$: Abbe's number of the negative lens $L_{12}$ in said front group.

Thus the present invention can provide a zoom lens which, in a simple and compact structure, has a zoom ratio exceeding 2.0 and satisfactorily corrected aberrations.

DESCRIPTION OF THE PREFERRED EMBODIMENTS

Now the present invention will be clarified in detail by preferred embodiments thereof shown in the attached drawings.

Figure 1:
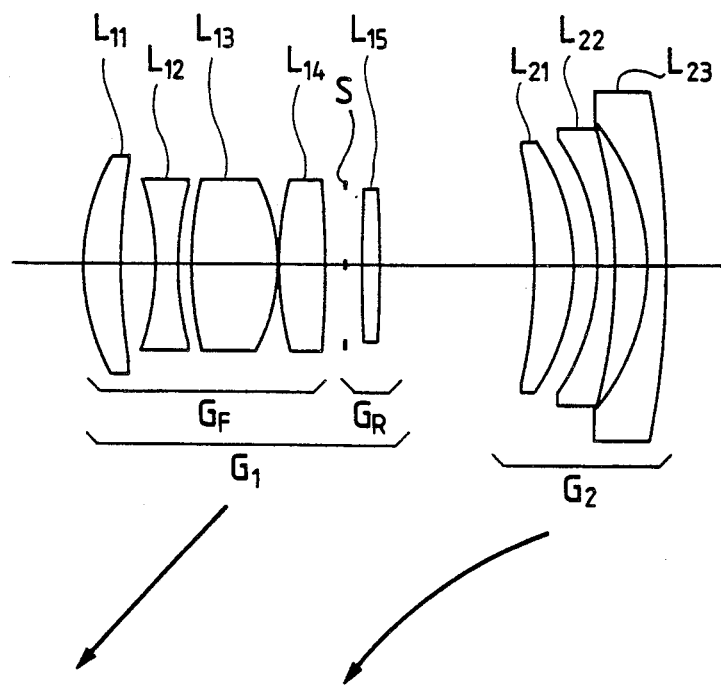
FIGS. 1, 2, 3, 4, 5, 6, 7 and 8 respectively illustrate lens structures in 1st to 8th embodiments of the present invention.
Figure 2:
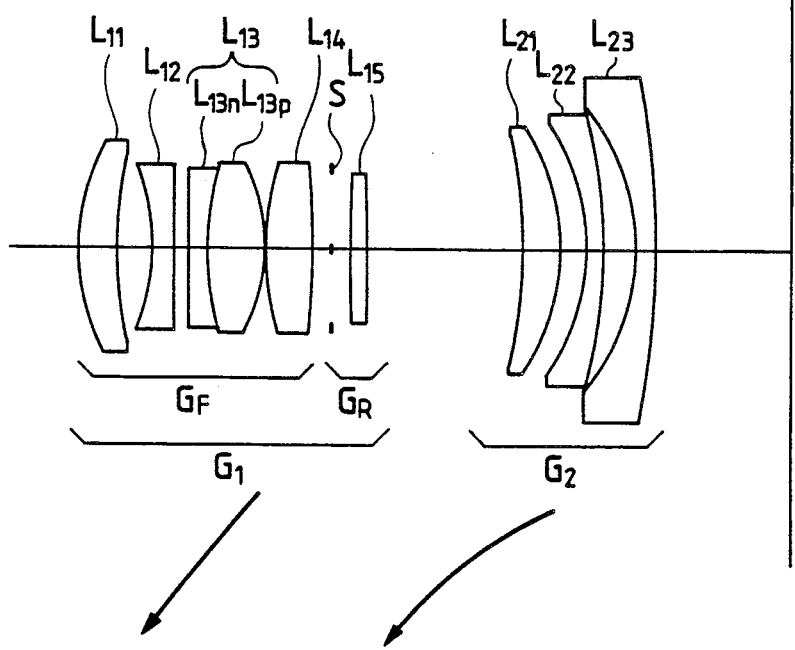
Figure 3:
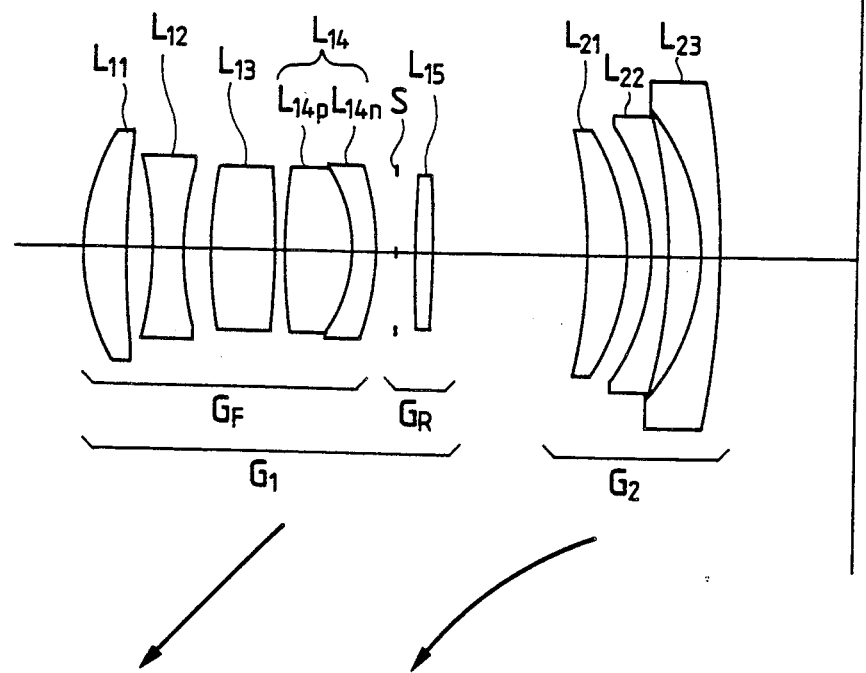
Figure 4:
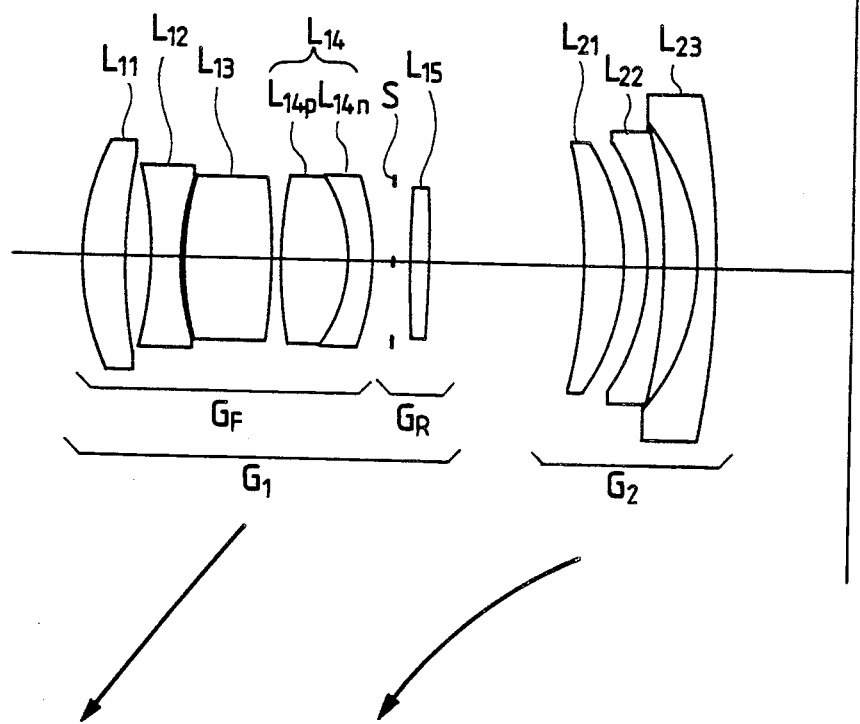
Figure 5:
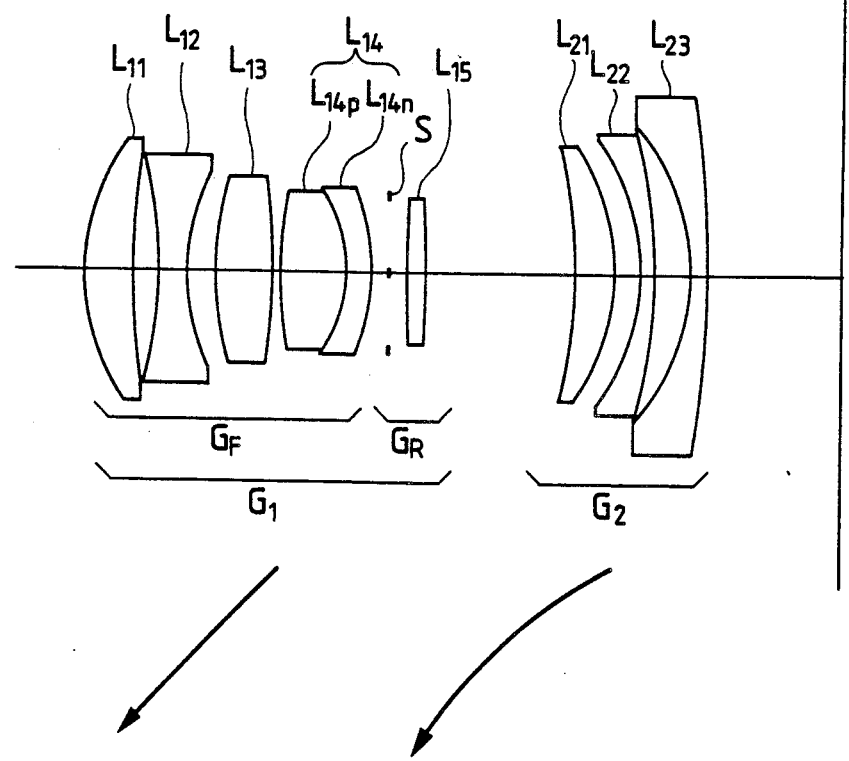
Figure 6:
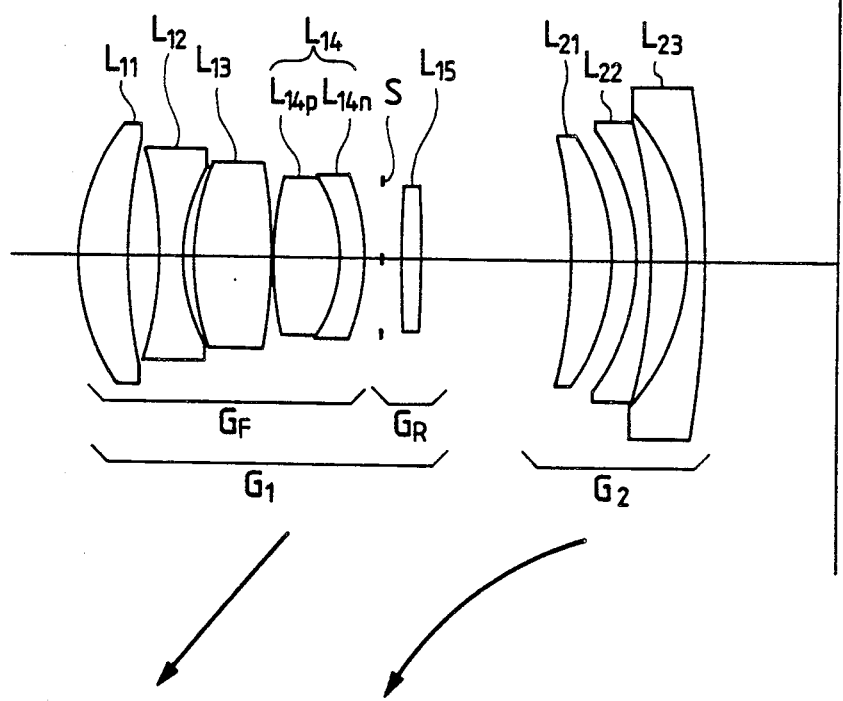
Figure 7:
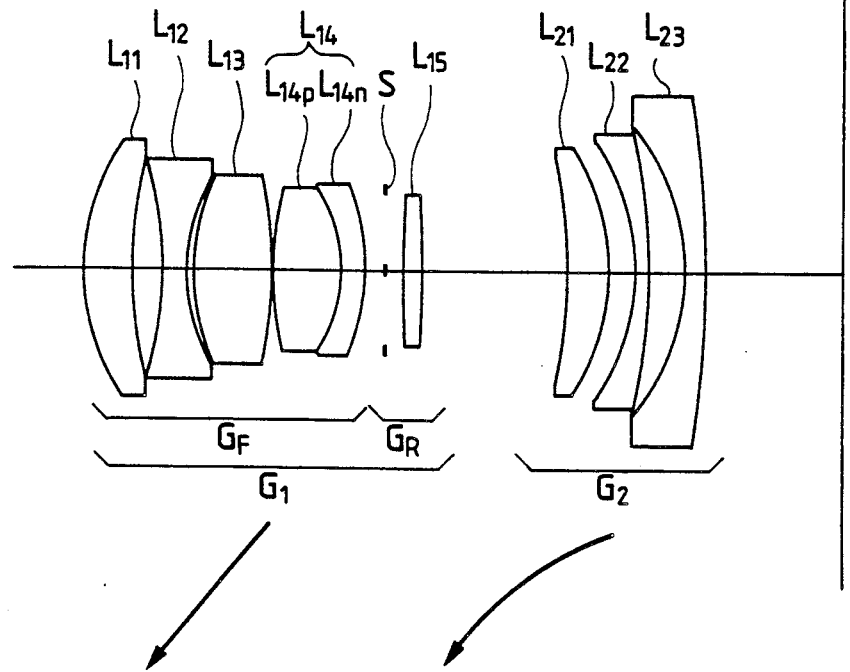
Figure 8:
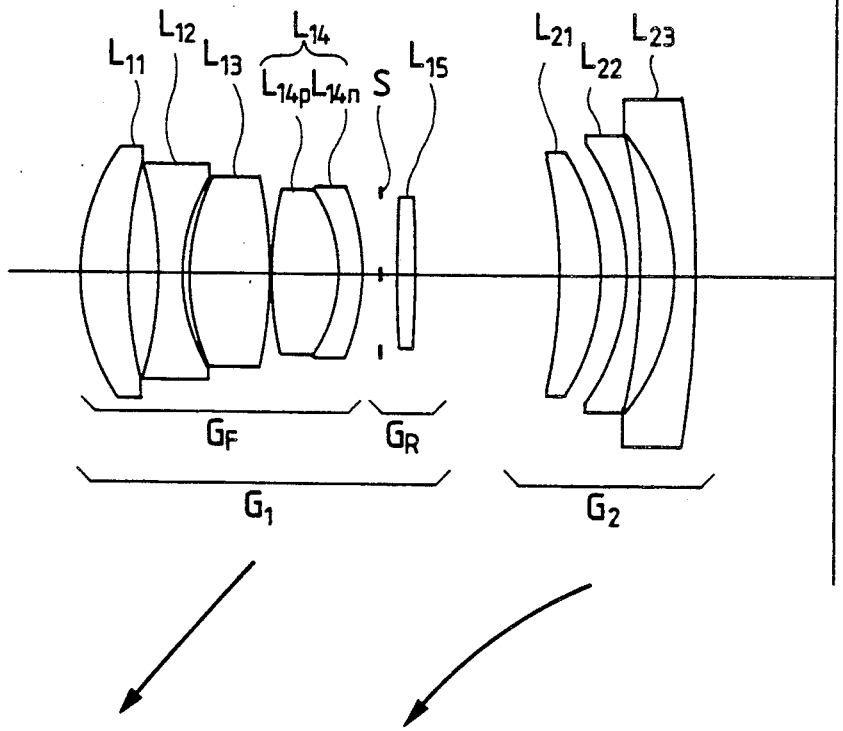

As shown in FIG. 1, the zoom lens of the present invention comprises a first lens group $G_1$ of a positive refractive power and a second lens group $G_2$ of a negative refractive power, arranged in this order from the object side, and effects zooming operation by varying the distance of said lens groups;

wherein said first lens group $G_1$ comprises a front group $G_F$ of a positive refractive power; and a rear group $G_R$ of a positive refractive power, arranged in this order from the object side;

said front group $G_F$ comprises a positive meniscus lens $L_{21}$ having a convex face to the object side; a negative lens $L_{12}$ having a concave face to the object side; a positive lens component $L_{13}$; and a positive lens component $L_{14}$, arranged in this order from the object side;

said rear group $G_R$ comprises a positive lens $L_{15}$; and said second lens group $G_2$ comprises a positive meniscus lens $L_{21}$ having a convex face to the image side; a negative lens $L_{22}$; and a negative meniscus lens $L_{23}$ having a concave face to the object side, arranged in this order from the object side.

Within the above-explained basic structure, the zoom lens of the present invention further satisfies following relations:

$$-0.8 < f_2/f_W < -0.6 \quad (1)$$

$$2.6 < f_R/f_F < 8 \quad (2)$$

$$0.45 < f_{14}/f_W < 1.26 \quad (3)$$

$$-1.1 < f_{22}/f_W < -0.7 \quad (4)$$

$$1.5 < Q_{11} < 5 \quad (5)$$

$$-0.5 < Q_{12} < 1.3 \quad (6)$$

$$-1.8 < Q_{13} < 1 \quad (7)$$

$$-3 < Q_{21} < -2 \quad (8)$$

$$1.2 < Q_{23} < 1.8 \quad (9)$$

$$34 < \nu_{12} < 55 \quad (10)$$

wherein:

$f_W$: focal length of entire zoom lens at the wide angle end;

$f_2$: focal length of said second leng group $G_2$;

$f_F$: focal length of said front group $G_F$;

$f_R$: focal length of said rear group $G_R$;

$f_{14}$: focal length of the positive lens component $L_{14}$ in said front group;

$f_{22}$: focal length of the negative lens $L_{22}$ in said second lens group;

$Q_{11}$: shape factor of the positive meniscus lens $L_{11}$ in said front group;

$Q_{12}$: shape factor of the negative lens $L_{13}$ in said front group;

$Q_{13}$: shape factor of the positive lens component $L_{13}$ in said front group;

$Q_{21}$: shape factor of the positive meniscus lens $L_{21}$ in said second lens group;

$Q_{23}$: shape factor of the negative meniscus lens $L_{23}$ in said second lens group; and $\nu_{12}$: Abbe's number of the negative lens $L_{12}$ in said front group.

The above-mentioned shape factor is defined by:

$$Q = \frac{r_b + r_a}{r_b - r_a}$$

wherein $r_a$, $r_b$ are radii of curvature respectively of the object side and image side of a lens component.

Also the positive lens component $L_{13}$ in said front group is preferably composed, in the order from the object side, of a negative lens $L_{13n}$ and a positive lens $L_{13p}$ adhered thereto, satisfying following conditions:

$$15 < \nu_{13p} - \nu_{13n} \quad (11)$$

$$0.2 < n_{13n} - n_{13p} \quad (12)$$

wherein:

$\nu_{13p}$: Abbe's number of the positive lens $L_{13p}$ in the positive lens component $L_{13}$ of said front group $G_F$;

$\nu_{13n}$: Abbe's number of the negative lens $L_{13n}$ in the positive lens component $L_{13}$ of said front group $G_F$;

$n_{13n}$: refractive index of the negative lens $L_{13n}$ in the positive lens component $L_{13}$ of said front group $G_F$; and $n_{13p}$: refractive index of the positive lens $L_{13p}$ in the positive lens component $L_{13}$ of said front group $G_F$.

Also the positive lens component $L_{14}$ in said front group may be composed, in the order from the object side, of a positive lens $L_{14p}$ and a negative lens $L_{14n}$ adhered thereto, satisfying the following conditions:

$$20 < \nu_{14p} - \nu_{14n} \quad (13)$$

$$0.15 < n_{14n} - n_{14p} \quad (14)$$

wherein:

$\nu_{14p}$: Abbe's number of the positive lens $L_{14p}$ in the positive lens component $L_{14}$ of said front group $G_F$;

$\nu_{14n}$: Abbe's number of the negative lens $L_{14n}$ in the positive lens component $L_{14}$ of said front group $G_F$;

$n_{14p}$ refractive index of the negative lens $L_{14n}$ in the positive lens component $L_{14}$ of said front group $G_F$; and $n_{14p}$ refractive index of the positive lens $L_{14p}$ in the positive lens component $L_{14}$ of said front group $G_F$.

The above-explained structure of the present invention allows to reduce the entire length of the lens while securing a certain behind-lens focal length by providing each lens group with a stronger refractive force, and still enables to correct the aberrations which tend to aggravate due to said stronger refractive force.

Firstly, the first lens group is given a stronger refractive force in order to reduce the moving amounts of the first and second lens groups $G_1$, $G_2$ thereby realizing a compact length while securing a certain behind-lens focal length. Also the refractive force of the first lens group $G_1$ is shared by the front group $G_F$ and the rear group $G_R$ whereby the aberrations which generally result from a stronger refractive force in a lens system can be extremely satisfactorily corrected.

The variation in the curvature of the meridional image plane, resulting from zooming, can also be satisfactorily reduced, since positive and negative image plane curvatures respectively generated by the front group $G_F$ and the rear group $G_R$ can be balanced with a positive image plane curvature generated in the second lens group $G_2$.

Also the spherical aberration can be almost satisfactorily corrected by the front group $G_F$, so that the variation in the spherical aberration can be maintained extremely small in moving the front group $G_F$ only at the focusing operation with the front lens group. In such structure, since the distance between the rear group $G_R$ and the second lens group $G_2$ is constant, it is rendered possible to suppress the positional change, resulting from the focusing operation, of the diagonal ray entering the second lens group $G_2$. It is therefore possible to reduce, in well balanced manner, the variations in the image plane curvature and in the distortion aberration in a state focused to a short distance.

In the following there will be explained in detail the aforementioned conditions of the present invention.

The condition (1) is required in order to realize a compact total length with a certain behind-lens focal length and a high zoom ratio, while achieving satisfactory corrections of the various aberrations.

The condition (1) defines the optimum focal length of the second lens group $G_2$. Above the upper limit of the condition (1), the second lens group $G_2$ will have a stronger refractive power, which will be advantageous for compactization and for a higher zoom ratio, but disadvantageous for correcting aberrations. Particularly at the wide angle end, there will appear excessively large positive distortion aberration and image plane curvature, which are extremely difficult to correct. On the other hand, a range below the lower limit of the condition (1) is undesirable, because compactization and high zoom ratio are extremely difficult to achieve though the corrections of aberrations are easier. For achieving further compactization, the lower limit of the condition (1) is preferably selected as $-0.72$.

The condition (2) defines the optimum ratio of refractive power of the first lens group shared by the front group $G_F$ and the rear group $G_R$, for reducing the variation in the aberrations resulting from the focusing operation, while reducing the aberrations generated particularly by the front group $G_F$. In addition, in a structure with the front group $G_F$ and the rear group $G_R$ arranged across a diaphragm respectively at the object side and at the image side, this condition (2) also serves to control the image plane curvatures of the front and rear groups in well balanced manner, to balance said image plane curvatures with the image plane curvature generated in the second lens group $G_2$, and to satisfactorily reduce the variations in the aberrations in the focusing and zooming operations.

Above the upper limit of the condition (2), the refractive power of the rear group $G_R$ will become excessively weak, requiring a strong refractive power in the front group $G_F$ and resulting in a large negative image plane curvature, whereby the variations of aberrations at zooming will become undesirably large. On the other hand, below the lower limit of the condition (2), the refractive power of the rear group $G_R$ will become excessively strong, thus resulting in an undesirably strong spherical aberration.

The condition (3) defines the optimum focal length for the positive lens component $L_{14}$ in the first lens group, for obtaining a high zoom ratio. A larger refractive power in said positive lens component $L_{14}$ will move the principal point of the first lens group $G_1$ to the image side, whereby the air gap between the first and second lens groups can be made larger when the distance of the principal points thereof is constant. A larger air gap allows to extend the zoom ratio toward the telephoto side.

Above the upper limit of the condition (3), the refractive power of the positive lens component $L_{14}$ will become weak, moving the principal point of the first lens group $G_1$ toward the object side, whereby the air gap between the first and second lens groups cannot be made large. For this reason a high zoom ratio is difficult to achieve.

On the other hand, below the lower limit the refractive power of the positive lens component $L_{14}$ will become strong, moving the principal point of the first lens group $G_1$ to the image side. Thus a large air gap can be realized between the first and second lens groups, facilitating to obtain a high zoom ratio. However, the positive lens component $L_{14}$ will generate an excessively large spherical aberration which is difficult to correct.

The condition (4) defines the optimum focal length of the negative lens $L_{22}$ in the second lens group, in order to achieve satisfactory correction on the image plane curvature and on the positive distortion aberration at the wide angle end.

Above the upper limit of the condition (4), the negative lens $L_{22}$ will have to have an excessively large negative refractive power in the second lens group $G_2$, whereby the variation in the image plane curvature in the zooming operation will become excessively large, and a significant positive distortion aberration will appear at the wide angle end. On the other hand, below the lower limit of the condition (4), though the refractive power shared by the negative lens $L_{22}$ in the second lens group $G_2$ is reduced, the negative lens component $L_{23}$, positioned behind said negative lens $L_{22}$, will be given a larger refractive power. Thus, the variation of image plane curvature in the zooming operation will become excessively large, and a significant positive distortion aberration will appear at the wide angle end, as in the area above the upper limit of the condition (4).

The condition (5) defines the optimum shape of the positive lens $L_{11}$ positioned closest to the object side in the first lens group, with respect to the correction of the distortion aberration.

A zoom lens composed of positive and negative lens groups, as in the present invention, tends to generate a positive distortion aberration particularly at the wide angle end. In order to prevent such positive distortion aberration, the positive lens $L_{11}$, positioned closest to the object side in the first lens group of positive refractive power, is required to have a meniscus shape with a convex face directed to the object side and satisfying the condition (5).

Above the upper limit of the condition (5), the spherical aberration becomes difficult to correct. On the other hand, below the lower limit of the condition (5), there will appear, at the wide angle end, a significant positive distortion aberration which is extremely difficult to correct.

The condition (6) is related to the corrections of the spherical aberration, distortion aberration and coma aberration, and defines the optimum shape of the negative lens $L_{12}$ in the first lens group, for correcting these aberrations in well balanced manner.

The negative refractive power of the negative lens $L_{12}$ has to be increased in order to correct the negative spherical aberration generated in the first leng group $G_1$ of positive refractive power. However, a stronger curvature of the concave face, directed to the object side, of the negative lens $L_{12}$ will generate an inwardly directed coma aberration because a ray below the off-axis ray is subjected to a strong diverging effect at the wide angle end. On the other hand, a weaker curvature of said concave face, directed to the object side, of the negative lens $L_{12}$ will lead to an undesirably significant positive distortion aberration at the wide angle end.

Also if the image-side face of said negative lens $L_{12}$ is composed of a strongly convex face directed to the image side, the object-side face of said negative lens $L_{12}$ will have to be composed of a strongly concave face directed to the object side. Such lens structure is however undesirable, because of the excessively inward coma aberration at the wide angle end.

Thus the condition (6) defines the lens shape optimizing the curvature of the negative lens $L_{12}$ in the first lens group. Above the upper limit of the condition (6), the negative lens $L_{12}$ will assume a strong meniscus shape with a concave face directed to the object side, wherein an excessive inward coma aberration will result from the strong curvature of the face at the object side of said negative lens $L_{12}$. On the other hand, below the lower limit of the condition (6), the negative lens $L_{12}$ will have a weak curvature on the face at the object side, whereby the positive distortion aberration generated at the wide angle end will become extremely difficult to correct.

The condition (7) defines the optimum lens shape of the positive lens component $L_{13}$ in the front group of the first lens group, for satisfactorily correcting the spherical aberration generated in the first lens group $G_1$.

Outside the limits of the condition (7), the positive lens component $L_{13}$ itself generates a significant spherical aberration which is difficult to correct.

The condition (8) defines the optimum shape of the positive lens $L_{21}$ closest to the object side in the second lens group $G_2$, for satisfactorily correcting the spherical aberration at the telephoto end. Because of its strong negative refractive power, the second lens group $G_2$ tends to generate a positive spherical aberration particularly at the telephoto end. For its well balanced correction, it is necessary to generate a large negative spherical aberration at the positive lens $L_{21}$ which is positioned closest to the object side in the second lens group $G_2$. In this case said positive lens $L_{21}$ has to have a meniscus shape convex to the image side, in order to satisfy the condition (8).

Above the upper limit of the condition (8), the second lens group $G_2$ generates a significant positive spherical aberration, thus destructing the balance of aberrations in the entire lens system. On the other hand, below the lower limit of the condition (8), off-axis aberrations aggravate at the wide angle end. More specifically, the higher order curvature of image plane increases to result in a significant coma aberration.

The condition (9) defines the optimum lens shape of the negative lens $L_{23}$ in the second lens group, in order to satisfactorily correct the off-axis aberrations at the wide angle end. For satisfactorily correcting the positive distortion aberration, negative image plane curvature etc. which tend to significantly appear at the wide angle end, the negative lens $L_{23}$ has to have a meniscus shape concave to the object side, so as to satisfy the condition (9).

Outside the limits of the condition (9), the off-axis aberrations, particularly the distortion aberration and the image plane curvature, become difficult to correct at the wide angle end.

The condition (10) defines the optimum Abbe's number for the negative lens $L_{12}$ of the first lens group $G_1$, in order to satisfactorily correct the color aberration, particularly the magnification color aberration.

The object-side face of said negative lens $L_{12}$ has a function of significantly diverging the incident ray, and has a shape particularly adversary to the off-axis ray.

Below the lower limit of the condition (10), the object-side face of said negative lens $L_{12}$ will tend to generate a higher-order curvature of the magnification color aberration, which is difficult to correct. On the other hand, above the upper limit of the condition (10), the axial color aberration will become difficult to correct, because of the small difference in Abbe's number between said negative lens and the positive lens $L_{11}$ or the positive lens component $L_{13}$ in the first lens group.

For further satisfactory correction of the spherical aberration and the color aberration, it is desirable to form the positive lens component $L_{13}$ or the position lens component $L_{14}$ in the first lens group $G_1$ by adhered positive and negative lenses.

In case the positive lens component $L_{13}$ in the first lens group is composed of adhered lenses, it is preferable to form said adhered lenses, in the order from the object side, by a negative lens $L_{13n}$ and a positive lens $L_{13p}$ adhered thereto, and it is more preferable to satisfy following conditions:

$$15 < \nu_{13p} - \nu_{13n} \tag{11}$$

$$0.2 < n_{13n} - n_{13p} \tag{12}$$

wherein:

$\nu_{13p}$: Abbe's number of the positive lens $L_{13p}$ in the positive lens component $L_{13}$ of said front group $G_F$;

$\nu_{13n}$: Abbe's number of the negative lens $L_{13n}$ in the positive lens component $L_{13}$ of said front group $G_F$;

$n_{13n}$: refractive index of the negative lens $L_{13n}$ in the positive lens component $L_{13}$ of said front group $G_F$; and $n_{13p}$: refractive index of the positive lens $L_{13p}$ in the positive lens component $L_{13}$ of said front group $G_F$.

The condition (11) defines the optimum difference in Abbe's number for achieving a higher dispersion in the negative lens $L_{13n}$ than in the positive lens $L_{13p}$ of the positive lens component $L_{13}$.

Outside the limits of the condition (11), the magnification color aberration and the axial color aberration will become extremely difficult to correct.

The condition (12) defines the optimum difference in refractive index for achieving a higher refractive index in the negative lens $L_{13n}$ than in the positive lens $L_{13p}$ in the positive lens component $L_{13}$.

Outside the limits of said condition (12), satisfactory correction of the spherical aberration will become difficult.

Also in case the positive lens component $L_{14}$ in the first lens group $G_1$ is composed of adhered lenses, they are preferably composed, in the order from the object side, of a positive lens $L_{14p}$ and a negative lens $L_{14n}$ adhered thereto, and more preferably satisfy following conditions:

$$20 < \nu_{14p} - \nu_{14n} \tag{13}$$

$$0.15 < n_{14n} - n_{14p} \tag{14}$$

wherein:

$\nu_{14p}$: Abbe's number of the positive lens $L_{14p}$ in the positive lens component $L_{14}$ of said front group $G_F$;

$\nu_{14n}$: Abbe's number of the negative lens $L_{14n}$ in the positive lens component $L_{14}$ of said front group $G_F$;

$n_{14n}$: refractive index of the negative lens $L_{14n}$ in the positive lens component $L_{14}$ of said front group $G_F$; and $n_{14p}$: refractive index of the positive lens $L_{14p}$ in the positive lens component $L_{14}$ of said front group $G_F$.

The condition (13) defines the optimum difference in Abbe's number for realizing a higher dispersion in the negative lens $L_{14n}$ than in the positive lens $L_{14p}$ adhered thereto, in the positive lens component $L_{14}$.

Outside the limits of said condition (13), the axial color aberration will become difficult correct.

The condition (14) defines the optimum difference in refractive index, for realizing a higher refractive index in the negative lens $L_{14n}$ than in the positive lens $L_{14p}$ in the positive lens component $L_{14}$.

Outside the limits of the condition (14), the spherical aberration cannot be fully corrected, so that satisfactory correction of the spherical aberration will become difficult.

When the first lens group $G_1$ is solely composed of the front group $G_F$ and the rear group $G_R$ as in the present invention, the focusing operation is preferably achieved by the movement of the front group $G_F$ only. Such focusing operation allows to minimize the variations in the aberrations.

[Examples]

The present invention will be further clarified by examples thereof, concerning on compact zoom lenses of focal lengths of 36-78 mm and F-numbers of 3.6-7.8.

FIGS. 1 to 8 are respectively views showing lens structures of 1st to 8th examples of the present invention.

Each of the examples has a basic structure same as that of the 1st embodiment shown in FIG. 1, consisting, in the order from the object side of a first lens group $G_1$ which in turns consists of a front group $G_F$ composed of a positive meniscus lens $L_{11}$ convex to the object side, a negative lens $L_{12}$ and positive lenses $L_{13}$, $L_{14}$, and a rear group $G_R$ composed of a positive lens $L_{15}$, and of a second lens group $G_2$ composed of a positive meniscus lens $L_{21}$ convex to the image side, a negative lens $L_{22}$, and a negative meniscus lens $L_{23}$ concave to the object side, with a diaphragm stop S positioned between the front group $G_F$ and the rear group $G_R$.

In the 2nd example, the positive lens $L_{12}$ in the front group consists of adhered lenses composed, in the order from the object side, of a negative lens $L_{13n}$ and a positive lens $L_{13p}$ adhered thereto.

In the 3rd to 8th examples, the positive lens $L_{14}$ in the front group consists of adhered lenses composed, in the order from the object side, of a positive lens $L_{14p}$ and a negative lens $L_{14n}$ adhered thereto.

In each of the examples, the focusing operation is conducted by axial movement of the front group $G_F$ only, while the zooming operation is conducted by axial movement of the first lens group $G_1$ and the second lens group $G_2$ together toward the object side, in such a manner that the air gap therebetween is reduced.

Parameters of the 1st to 8th examples of the present invention are respectively shown in Tabs. 1 to 8, wherein the numbers in the left-hand column indicate the order from the object side; r is the radius of curvature of the lens face; d is the distance between lens faces or the thickness of a lens; and Abbe's number and refractive index n are given by the values for d-line ($\lambda=587, 6$ nm).

TABLE 1

(Example 1)

Focal length: $f = 36.0 \sim 78.0$
Image angle: $2\omega = 61.4° \sim 31.2°$
F-number: $3.6 \sim 7.7$

| | r | d | Abbe | n |
|---|---|---|---|---|
| 1 | 15.276 | 2.55 | 54.6 | 1.51454 |
| 2 | 41.199 | 2.40 | | |
| 3 | −18.216 | 1.50 | 43.3 | 1.84042 |
| 4 | 20.273 | 1.00 | | |
| 5 | 26.298 | 5.90 | 60.3 | 1.51835 |
| 6 | −14.175 | 0.15 | | |
| 7 | 25.498 | 3.20 | 82.6 | 1.49782 |
| 8 | −76.411 | (d 8) | | |
| 9 | 125.408 | 1.20 | 70.1 | 1.51860 |
| 10 | −125.408 | (d10) | | |
| 11 | −37.346 | 2.70 | 28.6 | 1.79504 |
| 12 | −16.086 | 1.70 | | |
| 13 | −15.768 | 1.20 | 33.9 | 1.80384 |
| 14 | −37.517 | 2.30 | | |
| 15 | −14.368 | 1.30 | 45.4 | 1.79668 |
| 16 | −63.175 | (B f) | | |

| | f | | | |
|---|---|---|---|---|
| f | 36.0437 | 55.0940 | 78.0057 | |
| d 8 | 2.6326 | 2.6326 | 2.6326 | |
| d10 | 10.818 | 4.8699 | 1.5639 | |
| B f | 9.3794 | 27.6282 | 49.5760 | |

TABLE 2

(Example 2)

Focal length: $f = 36.0 \sim 78.0$
Image angle: $2\omega = 61.2° \sim 31.1°$
F-number: $3.6 \sim 7.7$

| | r | d | Abbe | n |
|---|---|---|---|---|
| 1 | 16.334 | 2.55 | 54.6 | 1.51454 |
| 2 | 30.012 | 2.40 | | |
| 3 | −15.872 | 1.50 | 47.5 | 1.78797 |
| 4 | ∞ | 1.00 | | |
| 5 | ∞ | 1.30 | 47.5 | 1.78797 |
| 6 | 20.195 | 3.90 | 70.2 | 1.48749 |
| 7 | −13.386 | 0.15 | | |
| 8 | 20.190 | 3.20 | 70.2 | 1.48749 |
| 9 | −56.685 | (d 9) | | |
| 10 | 124.972 | 1.20 | 64.1 | 1.51680 |
| 11 | −124.972 | (d11) | | |
| 12 | −37.346 | 2.70 | 28.6 | 1.79504 |
| 13 | −16.086 | 1.70 | | |
| 14 | −15.768 | 1.20 | 33.9 | 1.80384 |
| 15 | −37.517 | 2.30 | | |
| 16 | −14.368 | 1.30 | 45.4 | 1.79668 |
| 17 | −63.175 | (B f) | | |

| f | 36.0437 | 55.0940 | 78.0057 |
|---|---|---|---|
| d 9 | 2.6195 | 2.6195 | 2.6195 |
| d11 | 10.8185 | 4.8695 | 1.5635 |
| B f | 9.3794 | 27.6282 | 49.5760 |

TABLE 3

(Example 3)

Focal length: $f = 36.0 \sim 78.0$
Image angle: $2\omega = 61.4° \sim 31.1°$
F-number: $3.6 \sim 7.7$

| | r | d | Abbe | n |
|---|---|---|---|---|
| 1 | 17.433 | 2.90 | 49.1 | 1.53172 |
| 2 | 64.652 | 1.80 | | |
| 3 | −28.785 | 2.00 | 40.9 | 1.79631 |
| 4 | 18.781 | 2.00 | | |
| 5 | 32.171 | 4.50 | 38.1 | 1.60342 |
| 6 | −54.513 | 0.60 | | |
| 7 | 39.143 | 4.60 | 56.0 | 1.56883 |
| 8 | −10.223 | 1.70 | 28.6 | 1.79504 |
| 9 | −16.962 | (d 9) | | |
| 10 | 145.857 | 1.20 | 60.7 | 1.60311 |
| 11 | −145.856 | (d11) | | |
| 12 | −37.346 | 2.70 | 28.6 | 1.79504 |
| 13 | −16.086 | 1.70 | | |

TABLE 3-continued (Example 3)

| | | | | |
|---|---|---|---|---|
| 14 | −15.768 | 1.20 | 33.9 | 1.80384 |
| 15 | −37.517 | 2.30 | | |
| 16 | −14.368 | 1.30 | 45.4 | 1.79668 |
| 17 | −63.175 | (B f) | | |

| | | | |
|---|---|---|---|
| f | 36.0441 | 55.0948 | 78.0071 |
| d 9 | 2.6064 | 2.6064 | 2.6064 |
| d11 | 10.8398 | 4.8908 | 1.5848 |
| B f | 9.3796 | 27.6287 | 49.5770 |

TABLE 4

(Example 4)

Focal length: f = 36.0~78.0
Image angle: 2 ω = 60.9°~31.1°
F-number: 3.6~7.7

| | r | d | Abbe | n |
|---|---|---|---|---|
| 1 | 17.966 | 2.90 | 45.9 | 1.54814 |
| 2 | 38.705 | 1.80 | | |
| 3 | −25.215 | 2.00 | 40.9 | 1.79631 |
| 4 | 18.736 | 0.30 | | |
| 5 | 25.395 | 6.00 | 40.8 | 1.58144 |
| 6 | −40.028 | 0.60 | | |
| 7 | 30.293 | 4.60 | 56.0 | 1.56883 |
| 8 | −10.922 | 1.70 | 28.8 | 1.79504 |
| 9 | −17.826 | (d 9) | | |
| 10 | 145.930 | 1.20 | 38.1 | 1.60342 |
| 11 | −145.933 | (d11) | | |
| 12 | −37.348 | 2.70 | 28.6 | 1.79504 |
| 13 | −16.086 | 1.70 | | |
| 14 | −15.768 | 1.20 | 33.9 | 1.80384 |
| 15 | −37.517 | 2.30 | | |
| 16 | −14.368 | 1.30 | 45.4 | 1.79668 |
| 17 | −63.175 | (B f) | | |

| | | | |
|---|---|---|---|
| f | 36.0440 | 55.0945 | 78.0066 |
| d 9 | 2.6928 | 2.6928 | 2.6928 |
| d11 | 10.8399 | 4.8909 | 1.5849 |
| B f | 9.3795 | 27.6285 | 49.5766 |

TABLE 5

(Example 5)

Focal length: f = 36.0~78.0
Image angle: 2 ω = 61.5°~31.2°
F-number: 3.6~7.8

| | r | d | Abbe | n |
|---|---|---|---|---|
| 1 | 15.855 | 3.30 | 45.9 | 1.54814 |
| 2 | 55.214 | 1.80 | | |
| 3 | −32.377 | 2.00 | 45.4 | 1.79668 |
| 4 | 14.430 | 2.00 | | |
| 5 | 23.497 | 4.00 | 60.3 | 1.51835 |
| 6 | −49.678 | 0.60 | | |
| 7 | 37.615 | 4.60 | 49.0 | 1.53172 |
| 8 | −9.497 | 1.70 | 25.5 | 1.80458 |
| 9 | −14.401 | (d 9) | | |
| 10 | 125.330 | 1.30 | 60.3 | 1.51835 |
| 11 | −125.330 | (d11) | | |
| 12 | −35.552 | 2.80 | 25.5 | 1.80458 |
| 13 | −15.907 | 1.80 | | |
| 14 | −14.971 | 1.00 | 25.5 | 1.80458 |
| 15 | −38.073 | 2.60 | | |
| 16 | −14.368 | 1.20 | 55.6 | 1.69680 |
| 17 | −76.229 | (B f) | | |

| | | | |
|---|---|---|---|
| f | 36.0456 | 55.0977 | 78.0124 |
| d 9 | 2.5319 | 2.5319 | 2.5319 |
| d11 | 10.5805 | 4.6315 | 1.3255 |
| B f | 9.2949 | 27.5452 | 49.4954 |

TABLE 6

(Example 6)

Focal length: f = 36.0~78.0
Image angle: 2 ω = 61.1°~31.1°

TABLE 6-continued (Example 6)

F-number: 3.6~7.8

| | r | d | Abbe | n |
|---|---|---|---|---|
| 1 | 16.064 | 3.30 | 45.9 | 1.54814 |
| 2 | 34.852 | 2.20 | | |
| 3 | −27.264 | 1.70 | 45.4 | 1.79668 |
| 4 | 14.350 | 0.70 | | |
| 5 | 19.364 | 5.50 | 59.0 | 1.51823 |
| 6 | −36.513 | 0.20 | | |
| 7 | 28.962 | 4.60 | 49.0 | 1.53172 |
| 8 | −10.025 | 1.70 | 25.5 | 1.80458 |
| 9 | −14.931 | (d 9) | | |
| 10 | 131.141 | 1.30 | 56.4 | 1.50137 |
| 11 | −131.141 | (d11) | | |
| 12 | −35.421 | 2.80 | 25.5 | 1.80458 |
| 13 | −15.791 | 1.80 | | |
| 14 | −14.773 | 1.00 | 25.5 | 1.80458 |
| 15 | −38.073 | 2.60 | | |
| 16 | −14.368 | 1.20 | 55.6 | 1.69680 |
| 17 | −73.062 | (B f) | | |

| | | | |
|---|---|---|---|
| f | 35.9970 | 55.0071 | 78.0200 |
| d 9 | 2.6026 | 2.6026 | 2.6026 |
| d11 | 10.6069 | 4.6532 | 1.3279 |
| B f | 9.2221 | 27.4321 | 49.4763 |

TABLE 7

(Example 7)

Focal length: f = 36.0~78.0
Image angle: 2 ω = 60.7°~31.1°
F-number: 3.6~7.8

| | r | d | Abbe | n |
|---|---|---|---|---|
| 1 | 15.720 | 3.30 | 49.0 | 1.53172 |
| 2 | 31.974 | 2.05 | | |
| 3 | −25.324 | 1.70 | 45.4 | 1.79668 |
| 4 | 13.392 | 0.37 | | |
| 5 | 16.525 | 5.50 | 59.0 | 1.51823 |
| 6 | −31.803 | 0.20 | | |
| 7 | 27.072 | 4.60 | 49.0 | 1.53172 |
| 8 | −10.870 | 1.70 | 25.5 | 1.80458 |
| 9 | −15.406 | (d 9) | | |
| 10 | 135.651 | 1.30 | 69.9 | 1.51860 |
| 11 | −135.651 | (d11) | | |
| 12 | −34.578 | 2.80 | 25.5 | 1.80458 |
| 13 | −15.527 | 1.80 | | |
| 14 | −14.559 | 1.00 | 25.5 | 1.80458 |
| 15 | −39.036 | 2.60 | | |
| 16 | −13.855 | 1.20 | 55.6 | 1.69680 |
| 17 | −66.874 | (B f) | | |

| | | | |
|---|---|---|---|
| f | 35.9978 | 55.0092 | 78.0238 |
| d 9 | 2.5868 | 2.5868 | 2.5868 |
| d11 | 10.1505 | 4.5747 | 1.4605 |
| B f | 9.3901 | 27.1616 | 48.6752 |

TABLE 8

(Example 8)

Focal length: f = 36.0~78.0
Image angle: 2 ω = 60.7°~31.1°
F-number: 3.6~7.8

| | r | d | Abbe | n |
|---|---|---|---|---|
| 1 | 16.116 | 3.30 | 45.9 | 1.54814 |
| 2 | 32.991 | 2.08 | | |
| 3 | −24.979 | 1.70 | 45.4 | 1.79668 |
| 4 | 13.126 | .40 | | |
| 5 | 16.161 | 5.50 | 64.1 | 1.51680 |
| 6 | −30.605 | .20 | | |
| 7 | 27.335 | 4.60 | 49.0 | 1.53172 |
| 8 | −10.895 | 1.70 | 25.5 | 1.80458 |
| 9 | −15.302 | (d 9) | | |
| 10 | 218.227 | 1.20 | 64.1 | 1.51680 |
| 11 | −108.027 | (d11) | | |
| 12 | −37.337 | 2.80 | 25.8 | 1.78472 |
| 13 | −15.804 | 1.80 | | |
| 14 | −14.848 | 1.00 | 25.5 | 1.80458 |

TABLE 8-continued (Example 8)

| | | | | |
|---|---|---|---|---|
| 15 | −40.004 | 2.60 | | |
| 16 | −13.934 | 1.20 | 55.6 | 1.69680 |
| 17 | −72.667 | (B f) | | |
| f | 35.9995 | 54.9996 | 78.0010 | |
| d 9 | 2.5180 | 2.5180 | 2.5180 | |
| d11 | 10.0856 | 4.5091 | 1.3934 | |
| B f | 9.6062 | 27.4444 | 49.0390 | |

Tab. 9 shows the parameters of the 1st to 8th examples of the present invention, corresponding to the above-explained conditions of the present invention.

TABLE 9

(Parameters corresponding to the conditions

| Ex. | $\dfrac{f_2}{f_W}$ | $\dfrac{f_R}{f_F}$ | $\dfrac{f_{14}}{f_W}$ | $\dfrac{f_{22}}{f_W}$ |
|---|---|---|---|---|
| 1 | −0.676 | 3.798 | 1.077 | −0.963 |
| 2 | −0.676 | 3.798 | 0.859 | −0.963 |
| 3 | −0.676 | 3.798 | 0.720 | −0.963 |
| 4 | −0.676 | 3.798 | 0.671 | −0.963 |
| 5 | −0.677 | 3.798 | 0.680 | −0.869 |
| 6 | −0.677 | 4.187 | 0.632 | −0.850 |
| 7 | −0.647 | 4.295 | 0.612 | −0.816 |
| 8 | −0.649 | 4.665 | 0.609 | −0.830 |

| Ex. | $Q_{11}$ | $Q_{12}$ | $Q_{13}$ | $Q_{21}$ | $Q_{23}$ |
|---|---|---|---|---|---|
| 1 | 2.179 | 0.053 | −0.300 | −2.513 | 1.589 |
| 2 | 3.388 | 1.000 | −1.00 | −2.513 | 1.589 |
| 3 | 1.738 | −0.210 | 0.258 | −2.513 | 1.589 |
| 4 | 2.733 | −0.147 | 0.224 | −2.513 | 1.589 |
| 5 | 1.806 | −0.383 | 0.358 | −2.619 | 1.465 |
| 6 | 2.710 | −0.310 | 0.307 | −2.609 | 1.490 |
| 7 | 2.934 | −0.308 | 0.316 | −2.630 | 1.523 |
| 8 | 2.910 | −0.311 | 0.309 | −2.468 | 1.474 |

| Ex. | $\nu_{12}$ | $\nu_{13p}-\nu_{13n}$ | $n_{13n}-n_{13p}$ | $\nu_{14p}-\nu_{14n}$ | $n_{14n}-n_{14p}$ |
|---|---|---|---|---|---|
| 1 | 43.3 | | | | |
| 2 | 47.5 | 22.7 | 0.3005 | | |
| 3 | 40.9 | | | 27.4 | 0.2262 |
| 4 | 40.9 | | | 27.4 | 0.2262 |
| 5 | 45.4 | | | 23.5 | 0.2729 |
| 6 | 45.4 | | | 23.5 | 0.2729 |
| 7 | 45.4 | | | 23.5 | 0.2729 |
| 8 | 45.4 | | | 23.5 | 0.2729 |

I claim:

1. A compact zoom lens having, in the order from the object side, a first lens group $G_1$ of a positive refractive power and a second lens group $G_2$ of a negative refractive power and effecting zooming operation by varying the distance of said lens groups;
   wherein said first lens group $G_1$ comprises, in the order from the object side, a front group $G_F$ of a positive refractive power and a rear group $G_R$ of a positive refractive power;
   said front group $G_F$ having, in the order from the object side, a positive meniscus lens $L_{11}$ with a convex face directed to the object side, a negative lens with a concave face directed to the object side, a positive lens component $L_{13}$ and a positive lens component $L_{14}$;
   said rear group $G_R$ having a positive lens $L_{15}$;
   wherein said second lens group $G_2$ comprises, in the order from the object side, a positive meniscus lens $L_{21}$ with a convex face directed to the image side, a negative lens $L_{22}$, and a negative meniscus lens $L_{23}$ with a concave face directed to the object side; and said zoom lens further satisfying following conditions:

$$-0.8 < f_2/f_W < -0.6 \quad (1)$$

$$2.6 < f_R/f_F < 8 \quad (2)$$

$$0.45 < f_{14}/f_W < 1.26 \quad (3)$$

$$-1.1 < f_{22}/f_W < -0.7 \quad (4)$$

$$1.5 < Q_{11} < 5 \quad (5)$$

$$-0.5 < Q_{12} < 1.3 \quad (6)$$

$$-1.8 < Q_{13} < 1 \quad (7)$$

$$-3 < Q_{21} < -2 \quad (8)$$

$$1.2 < Q_{23} < 1.8 \quad (9)$$

$$34 < \nu_{12} < 55 \quad (10)$$

wherein:
   $f_W$: focal length of entire zoom lens at the wide angle end thereof;
   $f_2$: focal length of said second lens group $G_2$;
   $f_F$: focal length of said front group $G_F$;
   $f_R$: focal length of said rear group $G_R$;
   $f_{14}$: focal length of positive lens component $L_{14}$ in said front group;
   $f_{22}$: focal length of negative lens $L_{22}$ in said second lens group;
   $Q_{11}$: shape factor of positive meniscus lens $L_{11}$ in said front group;
   $Q_{12}$: shape factor of negative lens $L_{12}$ in said front group;
   $Q_{13}$: shape factor of positive lens component $L_{13}$ in said front group;
   $Q_{21}$: shape factor of positive meniscus lens $L_{21}$ in said second lens group;
   $Q_{23}$: shape factor of negative meniscus lens $L_{23}$ in said second lens group; and
   $\nu_{12}$: Abbe's number of negative lens $L_{12}$ in said front group.

2. A compact zoom lens according to claim 1, wherein the positive lens component $L_{13}$ in said front group is composed, in the order from the object side, of a negative lens $L_{13n}$ and a positive lens $L_{13p}$ adhered thereto, and further satisfying following conditions:

$$15 < \nu_{13p} - \nu_{13n} \quad (11)$$

$$0.2 < n_{13n} - n_{13p} \quad (12)$$

wherein:
   $\nu_{13p}$: Abbe's number of positive lens $L_{13p}$ in the positive lens component $L_{13}$ of said front group $G_F$;
   $\nu_{13n}$: Abbe's number of negative lens $L_{13n}$ in the positive lens component $L_{13}$ of said front group $G_F$;
   $n_{13n}$: refractive index of negative lens $L_{13n}$ in the positive lens component $L_{13}$ of said front group $G_F$; and
   $n_{13p}$: refractive index of positive lens $L_{13p}$ in the positive lens component $L_{13}$ of said front group $G_F$.

3. A compact zoom lens according to claim 1, wherein the positive lens component $L_{14}$ in said front group is composed, in the order from the object side of a positive lens $L_{14p}$ and a negative lens $L_{14n}$ adhered thereto, and further satisfying following conditions:

$$20 < \nu_{14p} - \nu_{14n} \quad (13)$$

$$0.15 < n_{14n} - n_{14p} \quad (14)$$

wherein:

$\nu_{14p}$: Abbe's number of positive lens $L_{14p}$ in the positive lens component $L_{14}$ of said front group $G_F$;

$\nu_{14n}$: Abbe's number of negative lens $L_{14n}$ in the positive lens component $L_{14}$ of said front group $G_F$;

$\nu_{14n}$ refractive index of negative lens $L_{14n}$ in the positive lens component $L_{14}$ of said front group $G_F$; and $\nu_{14p}$: refractive index of positive lens $L_{14p}$ in the positive lens component $L_{14}$ of said front group $G_F$.

4. A compact zoom lens according to claim 1, wherein the focusing operation is conducted by axial movement of the front group $G_F$ alone of said first lens group $G_1$.

* * * * *